United States Patent
Lloyd et al.

(10) Patent No.: US 10,826,792 B2
(45) Date of Patent: Nov. 3, 2020

(54) UPDATING ELECTRONIC DEVICES USING A PUSH MODEL

(71) Applicant: Acumera, Inc., Austin, TX (US)

(72) Inventors: Timothy F. Lloyd, Austin, TX (US);
Mindy C. Preston, Chicago, IL (US);
Margo A. Baxter, Austin, TX (US);
Brett B. Stewart, Austin, TX (US)

(73) Assignee: ACUMERA, INC., Austin, TX (US)

( * ) Notice: Subject to any disclaimer, the term of this patent is extended or adjusted under 35 U.S.C. 154(b) by 0 days.

(21) Appl. No.: 16/137,334

(22) Filed: Sep. 20, 2018

(65) Prior Publication Data

US 2019/0036790 A1 Jan. 31, 2019

Related U.S. Application Data

(63) Continuation of application No. 14/941,350, filed on Nov. 13, 2015, now abandoned.

(51) Int. Cl.
*G06F 3/048* (2013.01)
*H04L 12/24* (2006.01)
*G06F 8/65* (2018.01)
*H04L 29/08* (2006.01)
*H04W 4/50* (2018.01)
*H04W 4/70* (2018.01)

(52) U.S. Cl.
CPC ............... *H04L 41/22* (2013.01); *G06F 8/65* (2013.01); *H04L 41/082* (2013.01); *H04L 41/0886* (2013.01); *H04L 67/12* (2013.01); *H04L 67/26* (2013.01); *H04L 67/34* (2013.01); *H04W 4/50* (2018.02); *G06F 3/048* (2013.01); *H04W 4/70* (2018.02)

(58) Field of Classification Search
CPC ............ G06F 3/048; G06F 8/65; H04W 4/50; H04W 4/70; H04L 41/22; H04L 41/082; H04L 41/0886; H04L 67/12; H04L 67/26; H04L 67/34
See application file for complete search history.

(56) References Cited

U.S. PATENT DOCUMENTS

| | | |
|---|---|---|
| 6,467,088 B1 | 10/2002 | alSafadi |
| 7,520,430 B1 | 4/2009 | Stewart |
| 9,740,472 B1 * | 8/2017 | Sohi .................... G06F 8/65 |

(Continued)

*Primary Examiner* — Xuyang Xia
(74) *Attorney, Agent, or Firm* — Kowert Hood Munyon Rankin and Goetzel PC

(57) ABSTRACT

Automatically updating electronic devices using a push model. A set of electronic devices may be selected for an update. A first plurality of devices of the set of devices for which the update is valid may be determined in accordance with a set of rules, e.g., safety check rules or business rules, where the determining is based on stored configuration information for each of the devices. Current configuration information and accessibility information may be received for each of the first plurality of devices, and based on the received current configuration information and accessibility information and the stored configuration information, a second plurality of devices of the set of devices for which the update is valid may be determined, where the second plurality is a subset of the first plurality. The update may be applied automatically to at least some of the second plurality of devices.

27 Claims, 3 Drawing Sheets

(56) References Cited

U.S. PATENT DOCUMENTS

| | | | |
|---|---|---|---|
| 2009/0327908 A1* | 12/2009 | Hayton | G06F 21/6218 715/744 |
| 2011/0202413 A1 | 8/2011 | Stewart | |
| 2012/0110150 A1* | 5/2012 | Kosuru | H04L 41/082 709/221 |
| 2012/0278454 A1 | 11/2012 | Stewart | |
| 2016/0057020 A1* | 2/2016 | Halmstad | H04L 41/22 715/740 |

* cited by examiner

UPDATING ELECTRONIC DEVICES USING A PUSH MODEL

PRIORITY DATA

This application is a continuation of U.S. application Ser. No. 14/941,350, titled "Updating Electronic Devices Using a Push Model", filed Nov. 13, 2015, which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

This invention relates to electronic device updating in general, and more particularly, to automatic updating of electronic devices using a push model.

DESCRIPTION OF THE RELATED ART

The modern proliferation of networked electronic devices, particularly the "Internet of Things" (IOT), e.g., machine to machine network interactions, and accelerated development cycles has resulted in an increase in firmware, software, or configuration updates, whereby the devices may be modified, e.g., to provide updated feature sets, correct bugs or other errors, and so forth, e.g., by a central entity.

In typical electronic device (firmware, software, or configuration) updating approaches, a vendor or manufacturer informs devices (or users of such devices) that an update, e.g., a new version of the firmware, is available, and the devices (or endpoints) "come and get it" if they want it. In other words, the devices are updated via a "pull model", where the devices "pull" the update from some server computer(s), e.g., over a network, e.g., the Internet, as desired. In other words, the devices themselves (under control of their users) are responsible for requesting or initiating the updates. FIG. 1 is a high level illustration of electronic device updating using a pull model, according to the prior art. As FIG. 1 shows, each electronic device 12 (A, B, C, and D) requests or initiates an update from a configuration device 10, e.g., via a request sent from the electronic device to the configuration device 10, as indicated by the dashed arrows in the figure. In response to these device requests/initiations, the configuration device 10 updates each device, e.g., by sending an update package to the device over the network and applying the update to the device. Note that as used herein, similar or identical devices may be referred to generically or collectively by a single alphanumeric reference, e.g., electronic devices 10, and may be distinguished individually via alphabetic suffixes, e.g., respective electronic devices 10A, 10B, and so forth.

However, there are disadvantages to the "pull model" approach. For example, a user of a device may not be timely in initiating such an update after an update notification, and thus, the associated device may remain vulnerable to some newly discovered threat against which a timely update may have protected the device. As another example, particularly regarding the TOT, electronic devices increasingly operate on a machine-to-machine basis, where many (or even most) machines do not have an associated direct user, but rather, interact with, and operate primarily (or even exclusively) with respect to, other machines, and thus do not lend themselves to user mediated updating, e.g., stationary routers, gasoline storage tanks, remote instruments, thermostats, and so forth. Such "thing" endpoints, not having an owner like a smartphone does, are rarely granted the autonomy to make a "pull" decision regarding device updates.

Accordingly, improved systems and methods for updating electronic devices are needed.

SUMMARY OF THE INVENTION

Systems and methods for updating electronic devices via a push model are presented.

A system for updating devices using a push model may include a processor, and a memory medium coupled to the processor, where the memory medium stores program instructions executable by the processor to perform embodiments of the following method. For example, the processor and memory medium may be included in a configuration device that is communicatively coupled to a plurality of electronic devices, e.g., stationary routers, smartphones, etc., for which updates may be required or desired.

In some embodiments, a set of target devices may be selected for an update, and a first plurality of target devices of the set of target devices for which the update is valid may be determined in accordance with a set of rules, e.g., safety check rules and/or business rules. In some embodiments, the rules may apply to multiple different device types or models.

The determining of the first plurality of target devices may be based on stored configuration information for each of the target devices. Current configuration information and accessibility information for each of the first plurality of target devices may be received, and, based on the received current configuration information, the accessibility information, and the stored configuration information, a second plurality of target devices of the set of target devices for which the update is valid may be determined. The current configuration for each target device may be received from one or more of: the target device, cloud storage, or a storage device. The second plurality may be a subset of the first plurality. In some embodiments, determining the second plurality of target devices of the set of target devices may be further based on the set of rules.

The update may then be applied to each of at least some of the second plurality of target devices.

In some embodiments, determining the first plurality of target devices of the set of target devices for which the update is valid may include determining compatibility of the update with one or more of: hardware of each target device, software of each target device, or configuration information of each target device. Determining compatibility of the update may be based at least partly on one or more of: version of software for each target device, or version of configuration information for each target device.

The update may be any of a variety of kinds of update, e.g., the update may include one or more of: firmware modification, firmware configuration modification, software modification (e.g., including new software, replacement software, software upgrades, etc.), software configuration modification, at least one parameter modification, or at least one parameter configuration modification, among others.

Note that the software may include operating system software, software applications, drivers, or any other type of software, as desired.

In one embodiment, determining the first plurality of target devices may include determining at least one target device for which the update is not valid, and the method may further include presenting a graphical user interface (GUI), receiving, to the GUI, user input manually overriding the determining the at least one target device, and including the at least one target device in the first plurality of target devices in response to the receiving user input.

Similarly, in some embodiments, determining the first plurality of target devices may include determining at least one target device for which the update is valid, and the method may include presenting a graphical user interface (GUI), receiving, to the GUI, user input manually overriding the determining the at least one target device, and excluding the at least one target device from the first plurality of target devices in response to said receiving user input.

In a further embodiment, the method may include presenting a graphical user interface (GUI), receiving, to the GUI, user input indicating the set of target devices for the update, and performing the selecting in response to the indicating. In another embodiment, the method may include receiving, to the GUI, user input modifying the safety check and/or business rules. Thus, a GUI may be provided whereby a user or manager may invoke, stop, modify, or otherwise manage the push based updating techniques disclosed herein.

BRIEF DESCRIPTION OF THE DRAWINGS

Advantages of the present invention will become apparent to those skilled in the art with the benefit of the following detailed description and upon reference to the accompanying drawings in which.

Figure 1:
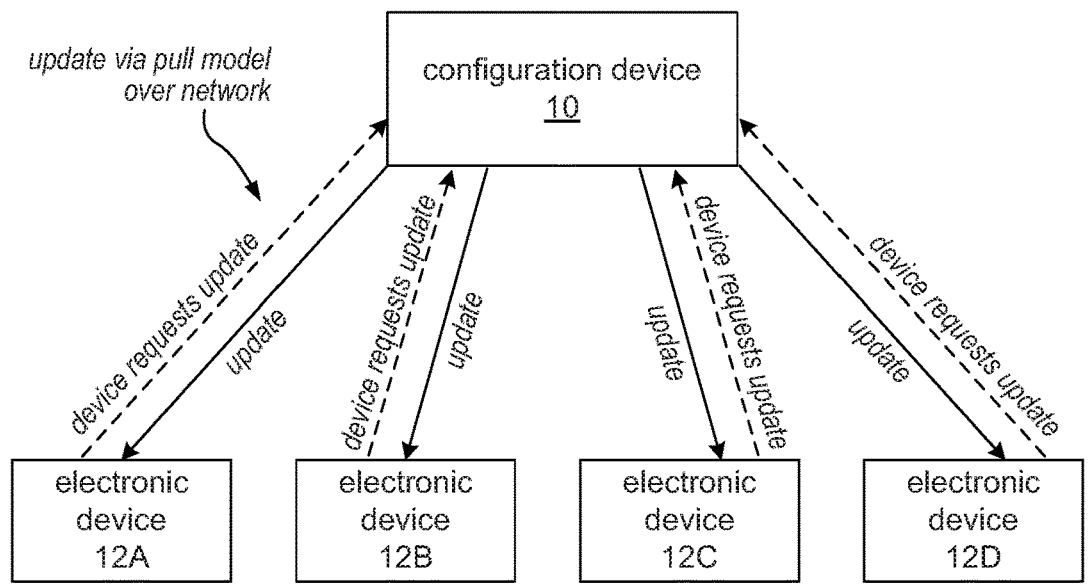
FIG. 1 is an illustration of electronic device updating over a network using a pull model, according to the prior art.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known structures and techniques have not been shown in detail to avoid obscuring the present invention.

Figure 2:
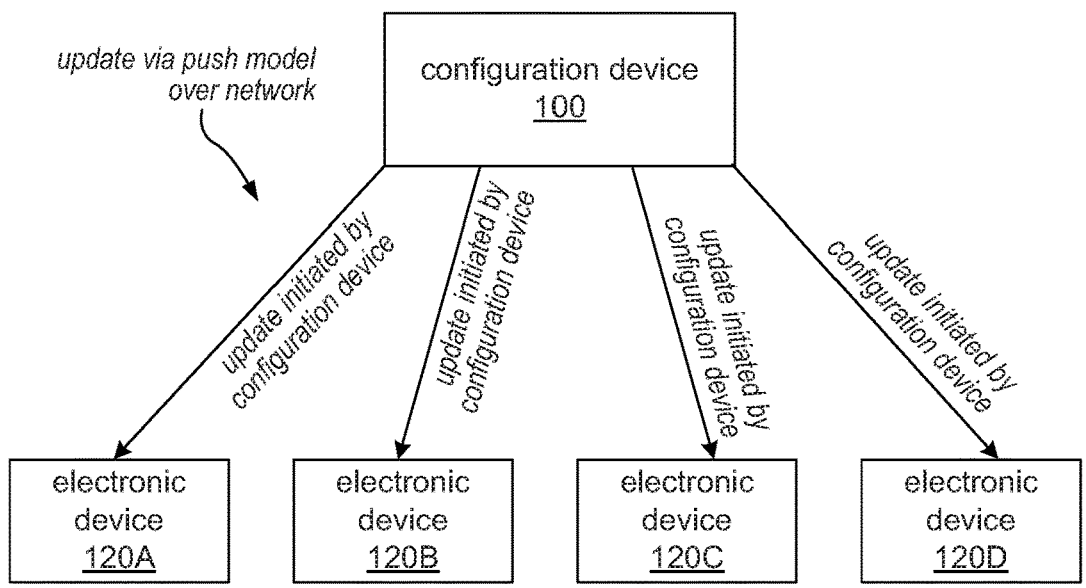
FIG. 2 is an illustration of electronic device updating over a network using a push model, according to one embodiment.

FIG. 2 is an illustration of electronic device updating using a push model over a network, according to one embodiment. As may be seen, in FIG. 2 a device 100, e.g., a configuration device, e.g., a central configuration device, may be communicatively coupled over a network, such as the Internet, to a plurality of electronic devices 120, in this exemplary case, electronic devices 120A-120D. Note that the term "central configuration device" denotes any type of computing device that operates to provide updates to (i.e., to configure) multiple electronic devices, e.g., over a network, such as the Internet. The use of a central configuration device 100 may allow, facilitate, or provide managed updates or deployments across an arbitrary number of sites (e.g., business or enterprise sites) or devices 120.

As FIG. 2 indicates, in contrast with the prior art "pull" based updating system of FIG. 1, in the system of FIG. 2, the electronic devices 120 do not send requests for updates, but rather the (central configuration) device 100 itself initiates (including providing) the updates for the connected devices 120. The device 100 may be configured to perform embodiments of the techniques disclosed herein. More details regarding such updating are provided below with reference to the method of FIG. 3.

Figure 3:
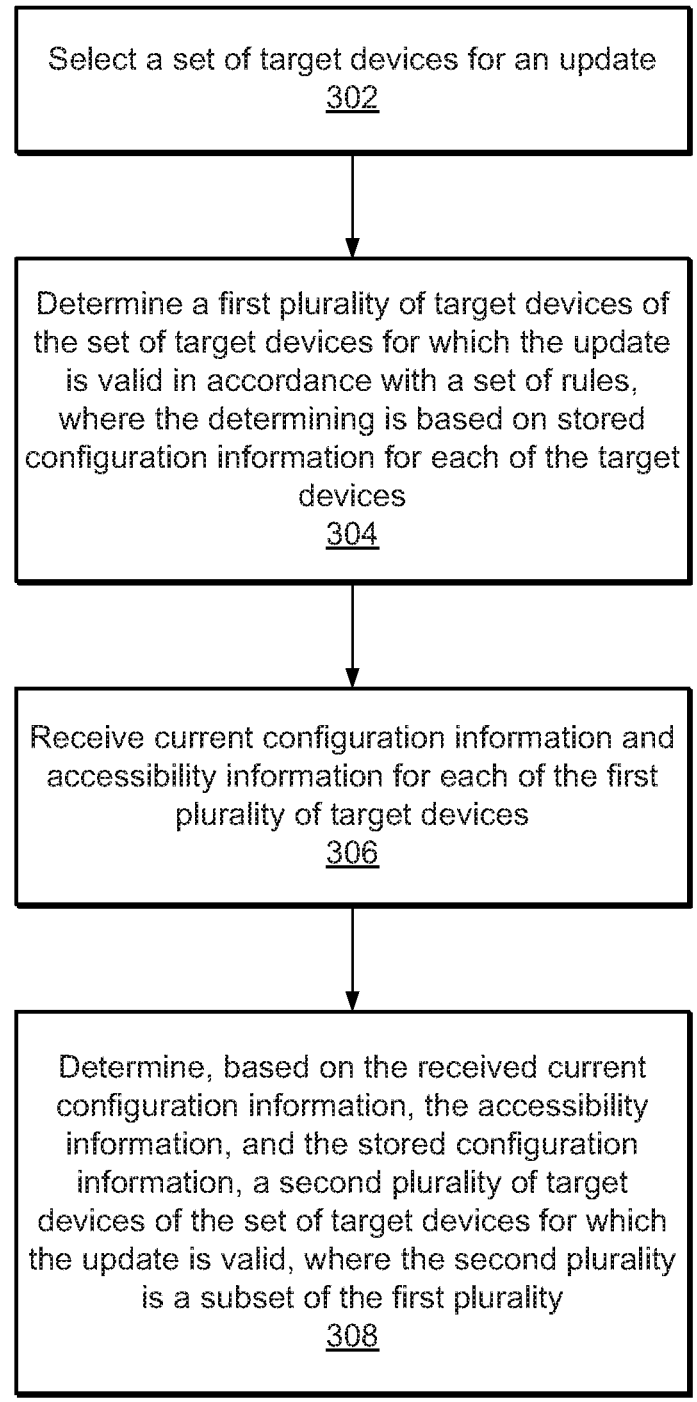
FIG. 3 is a flowchart that illustrates a method of updating electronic devices using a push model, according to one embodiment.

FIG. 3—Method of Updating Electronic Devices Using a Push Model

FIG. 3 illustrates a method for updating electronic devices using a push model, according to one embodiment. The method shown in FIG. 3 may be used in conjunction with any of the computing systems or devices shown in the above Figures, among other devices. In some embodiments, the method of FIG. 3 may be performed by an embodiment of the central configuration device 100 of FIG. 2. In various embodiments, some of the method elements shown may be performed concurrently, in a different order than shown, or may be omitted. Additional method elements may also be performed as desired. As shown, this method may operate as follows.

First, in 302, a set of target (electronic) devices may be selected for an update. The set of target devices may be selected via any of a variety of ways. For example, a database may be queried to identify target devices for a particular update. In one embodiment, a database of (electronic device) configurations may be queried (e.g., by the device 100) to create task lists of updates to be pushed, and a set of target devices that are at least candidates for the update(s) may be determined. For example, in one exemplary case in the context of smartphones, the database may be queried to "find all the smartphones that have "amber alerts" turned off", and a corresponding task/update to be performed on these devices may be to "turn the alert back on".

In 304, a first plurality of target devices of the set of target devices for which the update is valid may be determined in accordance with a set of rules, e.g., safety check rules and/or business rules.

As used herein, safety check rules relate to prevention of dangerous or technically inappropriate updates to the devices, and business rules relate to ensuring that updates for devices are appropriate for and consistent with business policies or directives of a business entity (or other institution, e.g., non-profit organizations, governments, societies, political parties, etc.). For example, exemplary safety check rules are: "do not attempt updates on devices with less than 2 Gb of memory", and "only update devices that implement protocol X". Exemplary business rules are: "do not attempt to update General Electric's (GE's) iPhone 3® s, only update GE's iPhone 4® s and iPhone 5® s", and "only update devices of company executives".

In one embodiment, the rules may apply to multiple different device types or models, and may be used in combination. In one embodiment, the determination of the first plurality of target devices may be made based on stored configuration information for each of the target devices (as well as the rules). Thus, similar to 302, in some embodiments, a database of (electronic device) configurations may be queried (e.g., by the device 100) to determine the first plurality of target devices, where one or more of the rules may be applied prior to the query, as part of the query, or to the results of the query. More specifically, in some embodiments, relevant subsets of the set of target devices to update may be identified, e.g., for each update, a respective subset of target devices may be determined, where in at least one embodiment, the rules may be used to determine at least some of the respective subsets of target devices.

For example, in one embodiment, the method may identify all of the smartphones owned by a business entity, e.g., General Electric, where a corresponding update may be to "disable use of Virtual Private Networks (VPNs)" for these (GE owned) devices. Note that in various embodiments, the database of configurations may be implemented locally, i.e., on the device 100 itself, or may be remote, i.e., accessed by the device 100 over the network (e.g., the Internet or another network, e.g., a LAN).

In 306, current configuration information and accessibility information for each of the first plurality of target devices may be received, e.g., over the network. In one embodiment, the current configuration information and accessibility information may be received from the electronic devices, e.g., in response to a request by the device 100. In another embodiment, the current configuration information and accessibility information may be received from a database, e.g., over a network, where the database is current, i.e., stores the current configuration information and accessibility information for each of the first plurality of target devices. More generally, the current configuration for each target device may be received from one or more of: the target device, cloud storage, or a storage device.

In 308, a second plurality of target devices of the set of target devices for which the update is valid may be determined based on the received current configuration information, the accessibility information, and the stored configuration information. The second plurality may be a subset of the first plurality. Moreover, in some embodiments, the determination of the second plurality of target devices may be further based on the rules, e.g., safety check rules and/or business rules, described above.

In some embodiments, the method may include automatically applying (or attempting to apply), i.e., pushing, the update to each of at least some of the second plurality of target devices. Note that due to performance of the previous method elements (302-308), the updates may be substantially guaranteed to be appropriate and successful. However, in some cases trouble may still arise, e.g., transient network problems, temporary unavailability of a device, an unexpected change or error in a device's configuration, and so forth. Accordingly, in some embodiments, the rules, e.g., safety check rules (and/or business rules), may be used to stop unsuccessful updates. An exemplary rule to this effect may be: "if 1% of the updates fail, stop the process of updating (e.g., "recall" the update)". In at least one embodiment, in addition to stopping the unsuccessful update for a device, the method may retry the update, e.g., if the device is simply not contactable at the moment, e.g., may attempt to apply the update after some time has elapsed.

In one embodiment, once the update has been pushed (applied or initiated) to a device, the method may request a reboot of the device, then receive information regarding the current state or configuration of the device, e.g., from one or more of: the target device, cloud storage, or a storage device. The current state may include one or more of: the current configuration of the device, currently installed firmware, software, or configuration data (e.g., including version information), system or device metrics and/or system or device diagnostics, e.g., temperature, connectivity, etc. The method may then compare this state or configuration information to an expected state or configuration, and based on the comparison, determine if the update was successful, e.g., did not cause problems. In some embodiments, file integrity modeling may be used to assess the device configuration and/or success of the update.

Moreover, in some embodiments, the above-described method elements (302-308) may be repeated, e.g., for respective updates.

Further Exemplary Embodiments

The following presents further exemplary embodiments of the techniques discussed herein, although it should be noted that the embodiments described are exemplary only, and are not intended to limit the invention to any particular form or functionality.

In various embodiments, determining the first plurality of target devices of the set of target devices for which the update is valid includes determining compatibility of the update with one or more of: hardware of each target device, software of each target device, or configuration information of each target device. For example, determining compatibility of the update may be based at least partly on one or more of: version of software for each target device, or version of configuration information for each target device.

In one embodiment, a graphical user interface (GUI) may be presented, e.g., on or by the configuration device 100, or some other device coupled to the configuration device. The above determining the first plurality of target devices (304) may include determining at least one target device for which the update is not valid. Moreover, in some embodiments, the method may further include receiving, to the GUI, user input manually overriding the determining the at least one target device (for which the update is not valid), and including the at least one target device in the first plurality of target devices in response to the receiving user input (overriding the determining). In other words, in some embodiments, a GUI may be provided whereby the user may override the method's determination of one or more of the automatically determined target devices for which the update is deemed invalid, and the one or more devices may be added to the first plurality of target devices.

Conversely, in some embodiments, the GUI may be used to override the method's inclusion of target devices in the first plurality of target devices. More specifically, the above determining the first plurality of target devices (304) may include determining at least one target device for which the update is valid, and the method may include receiving, to the GUI, user input manually overriding the determining the at least one target device, and excluding the at least one target device from the first plurality of target devices in response to the receiving user input (overriding the determining).

In one embodiment, a GUI may be implemented and presented regarding the rules of 304, e.g., safety check rules and/or business rules, and the method may further include receiving, to the GUI, user input indicating the set of target devices for the update, and the selecting of 302 may be performed in response to the indicating. In some embodiments, the method may include receiving, to the GUI, user input modifying the rules. Thus, the user may be provided the opportunity and means to guide or manually override one or more of the automated decisions of the method, or change the rules guiding such automated decision making. Thus, a GUI may be provided whereby a user or manager may invoke, stop, modify, or otherwise manage the push based updating techniques disclosed herein.

It should be noted that the update may be any of a variety of types of update. For example, in various embodiments, the update may include one or more of: firmware modification, firmware configuration modification, software (e.g., OS, applications, drivers) modification, software configuration modification, at least one parameter modification, e.g., a new value of a parameter or a new parameter, or at least one parameter configuration modification, e.g., limits or constraints on the values of a parameter, formats, etc. Thus, the update may pertain to any code or data stored on and used or executed by an electronic device, e.g., any code or data stored in some kind of memory of the device, e.g., flash memory, that affects the operation of the device.

Thus, in various embodiments, rules (business and/or safety check rules) may be used to determine acceptable updates (configuration jobs). The rules may be encoded and used in various ways, e.g., as mentioned above with respect to method element 304. Additionally or alternatively, the rules may be utilized at a later stage of the method, e.g., method element 308, where, following the above example regarding GE smartphones, the rules may include business rules that may specify that the method not attempt to update GE's iPhone 3® s, only update GE's iPhone 4® s and iPhone 5® s, or only update phones that have amber alerts turned on, although these particular examples are meant to be illustrative only. Thus, the rules may operate to further filter or cull the electronic devices to which the update may or will be applied.

In one embodiment, safety check rules may be utilized to stop unsuccessful updates. For example, in some embodiments, during or after application of the update to the electronic devices, one or more of the devices 120, e.g., end or endpoint devices, e.g., smartphones, may report their status back to the configuration device 100, which may then utilize the safety check rules to take responsive action. For example, at least one device 120 may report an unsuccessful update, e.g., due to problems with the device, the update, or some other issue preventing a successful update, and the method may attempt to reapply the update, apply a different update, restore a previous configuration, send a notification to the device or the device's owner or user, etc., based, for example, on a safety check rule, e.g., "if an update fails, notify a manager, and do not attempt to reapply the update."

In some embodiments, update status reports may be received (by configuration device 100) from most or all of the devices being updated, and the configuration device 100 may analyze the reports and take accordant action based on a safety check rule. For example, in one embodiment, as the reports are received the device 100 may track the percentage (or fraction) of electronic devices for which the update has failed ("sick updates" have been attempted), and if this percentage exceeds some specified threshold, e.g., 1%, 2%, 5%, and so forth, may stop the update process, recall the updates, rollback the updates, e.g., undo the successful updates, or take some other action, in accordance with the safety check rule, e.g., "stop the update if updates for more than 1% of the devices fail". Note that some minimum number of device update instances may be required before applying such statistics, which the safety check rule (or another safety check rule) may further specify.

In one embodiment, at least one of the electronic devices 120 may be configured to perform a "sanity check" regarding the offered (pushed) update, and may reject the update if it is determined to be inappropriate, e.g., unsafe, incompatible, or simply unwelcome. This ability of the devices 120 may be particularly important in the present push model based approach, in that under the push model entirely new features and capabilities may be offered that the device 120 or its user know nothing about, and which the user (or device 120) may not want. Thus, even under this push model approach, the user or device 120 may be provided the opportunity to decline the update, which is much more efficient than applying the update, then undoing it.

In some embodiments, the method may further include (the configuration device 100) calculating an approximate time to deployment completion, e.g., for each device 120, or for the entire second plurality of devices 120. This feature may be beneficial in helping the device 100 or a user/manager of the device 100 more efficiently manage and perform multiple updates. For example, estimates for update deployment may aid in devising an update schedule.

In various embodiments, automatically applying (or attempting to apply) the update(s) to each of at least some of the second plurality of target devices may be initiated (or performed) sequentially and/or concurrently. For example, in one embodiment where the device updates are initiated (or performed) sequentially, the method may confirm that a current device's update is complete and non-problematic before initiating the next device's update. However, in some embodiments where updates are initiated sequentially, a tolerance may be specified regarding the amount of time it takes to initiate or perform an update to a device, and if the tolerance is exceeded, the method may stop (or recall) the update and proceed to the next device.

In embodiments where updates are initiated (or performed) concurrently, a level of concurrency may be specified, e.g., based on available resources of the configuration device, the number of devices to update, network conditions, etc., e.g., updates of groups of (approximately) n devices may be initiated at a time, i.e., concurrently. In other words, the specified level of concurrency may include the number of devices to update concurrently. Note that the devices in such specified groups (numbers) of devices may be respectively updated concurrently, whereas the groups may be respectively updated sequentially. In other words, a first group may be updated concurrently, then a second group may be updated concurrently, and so forth. In further embodiments, two or more of the groups may be updated concurrently, e.g., one group of devices may be updated concurrently while another group of devices is also updated concurrently.

In one embodiment, an initial portion of the devices may be updated sequentially, and in response to achieving a specified level of success, e.g., 99.9% successful updates, may initiate (or perform) updates for at least some of the remaining devices (of the second plurality) concurrently, e.g., in accordance with the specified level of concurrency.

Thus, embodiments of the above techniques may be used to determine a list of electronic devices to which an update is to be applied (the second plurality of devices mentioned in 308 above), push the update individually to each device, monitor the update process/deployment, and stop any update that is causing trouble or is declined.

Staged Updating

As noted above, in some embodiments, automatically applying (or attempting to apply) the update(s) to at least some of the target devices may be initiated (or performed) sequentially, and that specified criteria regarding initial device updates may be used to determine how (or even if) subsequent updates are to be applied. The following presents embodiments of a method for performing staged updating of electronic devices, e.g., smart phones, etc. Note that in various embodiments, any of the above features (or none) may be utilized or incorporated in the below method as desired.

In one embodiment, an indication of a plurality of target devices for which an update has been determined to be valid may be determined according to a set of rules, e.g., safety check rules and/or business rules. The two or more target devices of the plurality of target devices may be sequentially updated, and this sequential updating may be monitored, thereby generating first results. Moreover, the method may further include concurrently updating remaining target devices of the plurality of target devices in response to the first results meeting specified criteria.

In some embodiments, the update being valid for a target device means or includes the update being compatible with one or more of: hardware of the target device, software of the target device, or configuration information of the target device. For example, in one embodiment, the compatibility of the update may be based at least partly on one or more of: version of software for each target device, or version of configuration information for each target device. Note that in some embodiments, the rules may apply to multiple different device types or models.

In one embodiment, the first results may include an indication of at least one target device for which the update was not successful, in which case, the method may determine that the update was not successful because the at least one target device was not accessible. The method may then determine subsequently that the at least one target device is accessible, and may update the at least one target device in response to this subsequent determination.

In some embodiments, a graphical user interface (GUI) may be implemented, and the first results may include an indication of at least one target device for which the update is valid. The method may further include receiving, to the GUI, user input manually overriding the first results for the at least one target device, and excluding the at least one target device from the above concurrently updating in response to receiving the user input. In other words, user input to the GUI may manually override the automatic updating process in this regard.

As discussed above, in various embodiments the update may include one or more of: firmware modification, firmware configuration modification, software modification, software configuration modification, at least one parameter modification, or at least one parameter configuration modification, among others.

In some embodiments, a GUI may be implemented, and may be configured to receive user input modifying the rules. Thus, the method may include receiving such user input to the GUI modifying the rules.

In one embodiment, concurrently updating remaining target devices of the plurality of target devices may include initiating concurrent updating of at least a portion of the remaining target devices using a first level of concurrency, monitoring the concurrent updating, thereby generating further results, and in response to the further results meeting further criteria, initiating concurrent updating of at least a successive portion of the target devices at a second level of concurrency, where the second level of concurrency is greater than the first level of concurrency. Additionally, in some embodiments, concurrently updating of remaining target devices of the plurality of target devices may further include repeating the monitoring and the initiating concurrent updating one or more times for further successive portions of the remaining target devices at respective successively greater levels of concurrency. Thus, the above technique may be applied successively to achieve greater levels of concurrency as warranted by successive results.

In one embodiment, a GUI may be implemented that is configured to receive user input specifying sizes of the at least a successive portion and the further successive portions of the remaining target devices, and/or rules for automatically specifying the sizes of the at least a successive portion and the further successive portions of the remaining target devices. Accordingly, the method may include receiving such user input to the GUI, and may proceed accordingly.

In some embodiments, the above concurrently updating of remaining target devices of the plurality of target devices may include initiating concurrent updating of at least a portion of the remaining target devices using a first level of concurrency, and monitoring the concurrent updating, thereby generating further results. Then, in response to the further results failing to meet further criteria, sequential updating of at least a successive portion of the remaining target devices may be initiated.

The method may also include rolling back the update for at least one of the plurality of target devices.

In one embodiment, the first results meeting specified criteria includes confirmation that, for each target device of at least a subset of the target devices, a current state of the target device matches an expected state of the target device. The current state of the target device may be received from any source(s), e.g., one or more of: the target device, cloud storage, or a storage device, among others.

In some embodiments, the sequential updating and/or the concurrently updating may include deploying an update to a first target device, and requesting reboot of the first target device.

Thus, embodiments of the above techniques may provide for improved updating of electronic devices.

Figure 4:
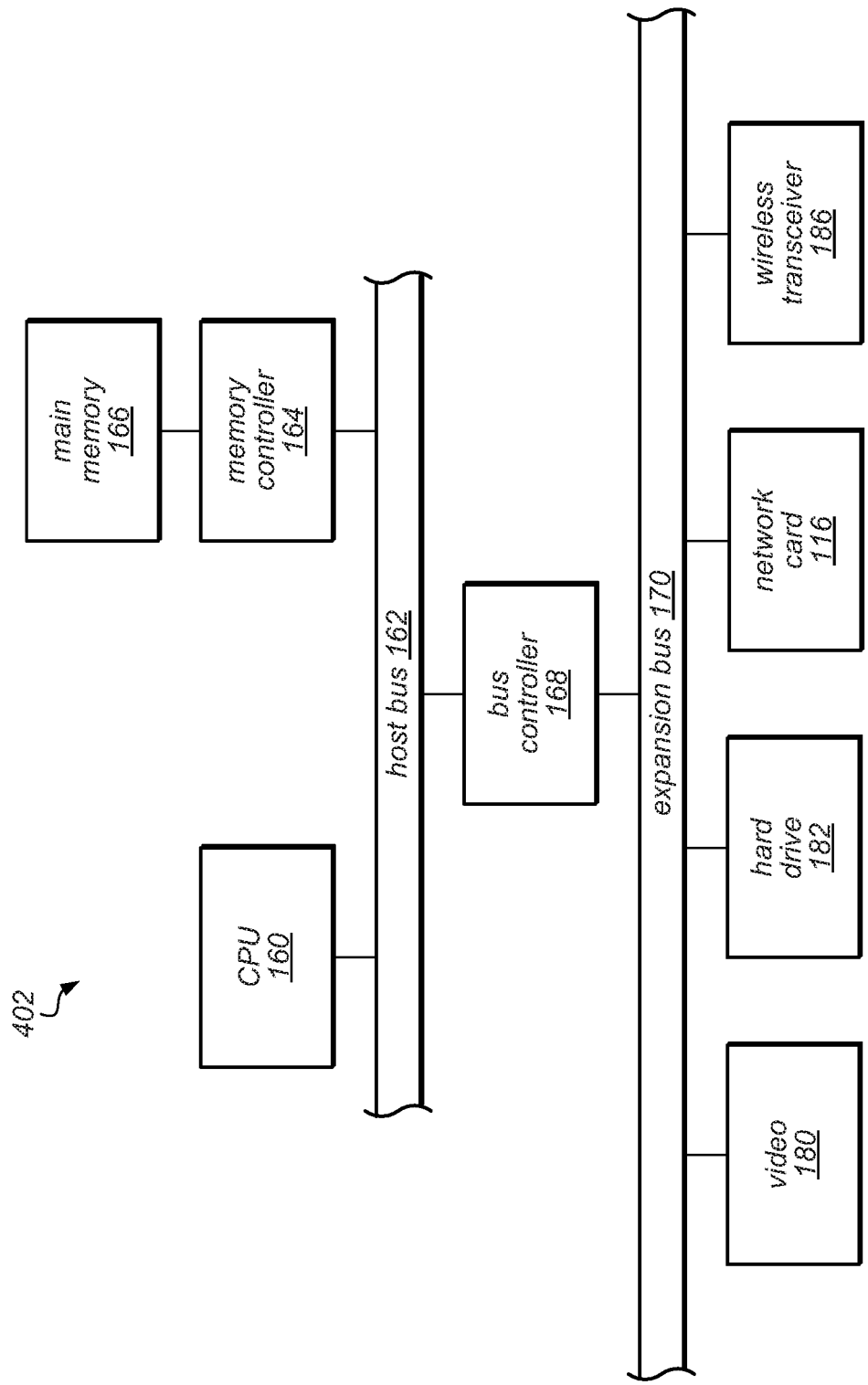
FIG. 4 is an exemplary block diagram of a computing device, according to one embodiment.

FIG. 4—Computing Device Block Diagram

FIG. 4 is a block diagram 402 representing one embodiment of a computing device, such as configuration device 100, or any of the electronic devices 120. As used herein, a computing device may be referred to as simply a "computer". It is noted, however, that any type of computing device configuration or architecture can be used as desired, and FIG. 4 illustrates an exemplary embodiment. For example, in various embodiments, the computing device may be a general purpose computer system, a computer implemented on a card installed in a chassis, a smartphone, an embedded device, a stationary router, a remote instrument, a smart sensor, or any other type of computing device that provides, manages, or requires updates. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC (Reduced Instruction Set Computing) processors, or an ARM (Advanced RISC Machine) processor, among others. A memory medium, typically comprising RAM and referred to as main memory, 166 is coupled to the host bus 162 by means of memory controller 164. The main memory 166 may store program instructions implementing embodiments of the novel techniques disclosed herein (see, e.g., the method of FIG. 3, described above). The main memory may also store operating system software, as well as other software for operation of the computer.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 may include slots for various devices or components coupled to the expansion bus 170, such as a video display subsystem 180, hard (or flash) drive 182, a network card 116, and a wireless transceiver 186, etc., among others.

As noted above, in various embodiments, the computing device(s) may be of any type desired.

Although the embodiments above have been described in considerable detail, numerous variations and modifications will become apparent to those skilled in the art once the above disclosure is fully appreciated. It is intended that the following claims be interpreted to embrace all such variations and modifications. Other embodiments may include various modifications and alterations that still fall within the scope of the contemplated embodiments. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. The words "include", "including", and "includes" mean including, but not limited to. As used herein, the singular forms "a", "an" and "the" include plural referents unless the content clearly indicates otherwise. Thus, for example, reference to "a device" includes a combination of two or more devices.

We claim:

1. A non-transitory computer accessible memory medium that stores program instructions executable to cause a computing device to:
   receive an indication of a plurality of target devices for which an update has been determined to be valid according to a set of rules;
   sequentially update two or more target devices of the plurality of target devices;
   monitor the sequential updating, thereby generating first results, wherein the first results comprise an indication of whether at least a first target device of the two or more target devices is successfully updated; and
   concurrently update remaining target devices of the plurality of target devices in response to the first results indicating that at least the first target device was successfully updated, wherein, in concurrently updating remaining target devices of the plurality of target devices, the program instructions are executable to cause the computing device to:
   initiate concurrent updating of at least a portion of the remaining target devices using a first level of concurrency;
   monitor the concurrent updating, thereby generating further results; and
   in response to the further results meeting further criteria, initiate concurrent updating of at least a successive portion of the target devices at a second level of concurrency, wherein the second level of concurrency is greater than the first level of concurrency.

2. The non-transitory computer accessible memory medium of claim 1, wherein the update being valid for a target device comprises the update being compatible with one or more of:
   hardware of the target device;
   software of the target device; or
   configuration information of the target device.

3. The non-transitory computer accessible memory medium of claim 2, wherein the compatibility of the update is based at least partly on one or more of:
   version of software for each target device; or
   version of configuration information for each target device.

4. The non-transitory computer accessible memory medium of claim 1, wherein the rules apply to multiple different device types or models.

5. The non-transitory computer accessible memory medium of claim 1, wherein the first results comprise an indication of at least one target device for which the update was not successful, and wherein the program instructions are further executable to cause the computing device to:
   determine the update was not successful because the at least one target device was not accessible;
   determine subsequently that the at least one target device is accessible; and
   update of the at least one target device in response to said determining subsequently.

6. The non-transitory computer accessible memory medium of claim 1, wherein the program instructions are further executable to implement a graphical user interface (GUI), wherein the first results comprise an indication of at least one target device for which the update is valid, and wherein the program instructions are further executable to cause the computing device to:
   receive, to the GUI, user input manually overriding the first results for the at least one target device; and
   exclude the at least one target device from said concurrently updating in response to said receiving user input.

7. The non-transitory computer accessible memory medium of claim 1, wherein the update comprises one or more of:
   firmware modification;
   firmware configuration modification;
   software modification;
   software configuration modification;
   at least one parameter modification; or
   at least one parameter configuration modification.

8. The non-transitory computer accessible memory medium of claim 1, wherein the program instructions are further executable to implement a graphical user interface (GUI), wherein the GUI is configured to:
   receive user input modifying the rules.

9. The non-transitory computer accessible memory medium of claim 1, wherein said concurrently updating of remaining target devices of the plurality of target devices further comprises:

repeating said monitoring and said initiating concurrent updating one or more times for further successive portions of the remaining target devices at respective successively greater levels of concurrency.

10. The non-transitory computer accessible memory medium of claim 9, wherein the program instructions are further executable to implement a graphical user interface (GUI), wherein the program instructions are executable to cause the GUI to:
receive user input specifying:
sizes of the at least a successive portion and the further successive portions of the remaining target devices; or
rules for automatically specifying the sizes of the at least a successive portion and the further successive portions of the remaining target devices.

11. A computer implemented method, comprising:
by a computing device:
receiving an indication of a plurality of target devices for which an update has been determined to be valid according to a set of rules;
sequentially updating two or more target devices of the plurality of target devices;
monitoring the sequential updating, thereby generating first results, wherein the first results comprise an indication of whether at least a first target device of the two or more target devices is successfully updated; and
concurrently updating remaining target devices of the plurality of target devices in response to the first results indicating that at least the first target device was successfully updated, wherein said concurrently updating remaining target devices of the plurality of target devices comprises:
initiating concurrent updating of at least a portion of the remaining target devices using a first level of concurrency;
monitoring the concurrent updating, thereby generating further results; and
in response to the further results meeting further criteria, initiating concurrent updating of at least a successive portion of the target devices at a second level of concurrency, wherein the second level of concurrency is greater than the first level of concurrency.

12. The computer implemented method of claim 11, wherein the update being valid for a target device comprises the update being compatible with one or more of:
hardware of the target device;
software of the target device; or
configuration information of the target device.

13. The computer implemented method of claim 12, wherein the compatibility of the update is based at least partly on one or more of:
version of software for each target device; or
version of configuration information for each target device.

14. The computer implemented method of claim 11, wherein the rules apply to multiple different device types or models.

15. The computer implemented method of claim 11, wherein the first results comprise an indication of at least one target device for which the update was not successful, the method further comprising:
determining the update was not successful because the at least one target device was not accessible;
determining subsequently that the at least one target device is accessible; and
updating of the at least one target device in response to said determining subsequently.

16. The computer implemented method of claim 11, wherein the computing device is configured to implement a graphical user interface (GUI), wherein the first results comprise an indication of at least one target device for which the update is valid, and wherein the method further comprises:
receiving, to the GUI, user input manually overriding the first results for the at least one target device; and
excluding the at least one target device from said concurrently updating in response to said receiving user input.

17. The computer implemented method of claim 11, wherein said concurrently updating of remaining target devices of the plurality of target devices comprises:
in response to the further results failing to meet further criteria, initiating sequential updating of at least a second successive portion of the remaining target devices.

18. The computer implemented method of claim 11, wherein the program instructions are further executable to perform:
rolling back the update for at least one of the plurality of target devices.

19. A system for updating devices using a push model, the system comprising:
a processor; and
a memory medium coupled to the processor, wherein the memory medium stores program instructions executable by the processor to cause the system to:
receive an indication of a plurality of target devices for which an update has been determined to be valid according to a set of rules;
sequentially update two or more target devices of the plurality of target devices;
monitor the sequential updating, thereby generating first results, wherein the first results comprise an indication of whether at least a first target device of the two or more target devices is successfully updated; and
concurrently update remaining target devices of the plurality of target devices in response to the first results indicating that at least the first target device was successfully updated, wherein, in concurrently updating remaining target devices of the plurality of target devices, the program instructions are executable to cause the system to:
initiate concurrent updating of at least a portion of the remaining target devices using a first level of concurrency;
monitor the concurrent updating, thereby generating further results; and
in response to the further results meeting further criteria, initiate concurrent updating of at least a successive portion of the target devices at a second level of concurrency, wherein the second level of concurrency is greater than the first level of concurrency.

20. The system of claim 19, wherein the update being valid for a target device comprises the update being compatible with one or more of:
hardware of the target device;
software of the target device; or
configuration information of the target device.

21. The system of claim 20, wherein the compatibility of the update is based at least partly on one or more of:

version of software for each target device; or version of configuration information for each target device.

22. The system of claim 19, wherein the rules apply to multiple different device types or models.

23. The system of claim 19, wherein the first results comprise an indication of at least one target device for which the update was not successful, and wherein the program instructions are further executable to cause the computing device to:

determine the update was not successful because the at least one target device was not accessible;

determine subsequently that the at least one target device is accessible; and update of the at least one target device in response to said determining subsequently.

24. The system of claim 19, wherein the first results meeting specified criteria comprises confirmation that, for each target device of at least a subset of the target devices:

a current state of the target device matches an expected state of the target device.

25. The system of claim 24, wherein the current state of the target device is received from one or more of:

the target device;

cloud storage; or a storage device.

26. The system of claim 19, wherein said sequential updating or said concurrently updating comprises:

deploying an update to a first target device; and requesting reboot of the first target device.

27. The system of claim 19, wherein the set of rules comprises at least one of:

a set of safety check rules; or a set of business rules.

* * * * *